United States Patent
Oh et al.

(10) Patent No.: US 7,224,090 B2
(45) Date of Patent: *May 29, 2007

(54) SURFACE-MOUNTABLE LINEAR VIBRATOR

(75) Inventors: Hwa Young Oh, Suwon (KR); Oung Il Park, Seoul (KR); Seong Pyo Hong, Suwon (KR); Joon Choi, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 289 days.

This patent is subject to a terminal disclaimer.

(21) Appl. No.: 10/962,515

(22) Filed: Oct. 13, 2004

(65) Prior Publication Data

US 2005/0285453 A1 Dec. 29, 2005

(30) Foreign Application Priority Data

Jun. 29, 2004 (KR) ........................ 10-2004-0049332

(51) Int. Cl.
*H02K 7/065* (2006.01)
*H02K 33/06* (2006.01)

(52) U.S. Cl. ................ 310/14; 310/81; 381/396; 340/484.7

(58) Field of Classification Search ............... 310/36, 310/71, 89, 68 R, 81, 12, 14; 381/396, 398, 381/409, 410, 412; 340/384.1, 384.7, 388.1
See application file for complete search history.

(56) References Cited

U.S. PATENT DOCUMENTS

| | | | |
|---|---|---|---|
| 4,050,066 A * | 9/1977 | Yanagisawa et al. | 340/388.1 |
| 4,644,204 A * | 2/1987 | Lakin | 310/89 |
| 5,682,132 A | 10/1997 | Hiroyoshi et al. | |
| 5,861,686 A * | 1/1999 | Lee | 310/36 |
| 5,956,622 A | 9/1999 | Lee | |
| 6,229,903 B1 | 5/2001 | Kobayashi | |
| 6,452,298 B1 * | 9/2002 | Fukuda et al. | 310/89 |
| 6,628,798 B2 * | 9/2003 | Teshima et al. | 381/396 |
| 6,713,914 B2 * | 3/2004 | Yoshida et al. | 310/89 |
| 7,038,335 B2 * | 5/2006 | Choi et al. | 310/12 |
| 2005/0184601 A1 * | 8/2005 | Kweon et al. | 310/36 |
| 2006/0002577 A1 * | 1/2006 | Won et al. | 381/396 |

FOREIGN PATENT DOCUMENTS

| | | |
|---|---|---|
| EP | 0 688 144 A2 | 12/1995 |
| JP | 2002-278928 | 10/2000 |
| JP | 2001-340812 | 12/2001 |

* cited by examiner

*Primary Examiner*—Tran Nguyen
(74) *Attorney, Agent, or Firm*—Lowe Hauptman & Berner (57) ABSTRACT

A surface-mountable linear vibrator includes a hollow cylindrical housing of a predetermined thickness having a space therein. An elastic member is fixed to an inner surface of the housing. A vibrating body includes a yoke fixed to the elastic member to be affected by elastic force in an axial direction of the housing, a weight fixed to the yoke, and a magnet fixed to the yoke. A circular substrate member is attached to a lower part of the housing, and provided with (i) a winding coil fixed to the upper surface thereof and (ii) a connection element formed on the lower surface thereof and electrically connected to the winding coil. Power is applied to the winding coil through the connection element.

20 Claims, 5 Drawing Sheets

SURFACE-MOUNTABLE LINEAR VIBRATOR

RELATED APPLICATIONS

This application claims the benefit of Korean Patent Application No. 2004-49332 filed on Jun. 29, 2004 in the Korean Intellectual Property Office, the disclosure of which is incorporated herein by reference.

BACKGROUND OF THE INVENTION

1. Field of the Invention

The present invention relates to a linear vibrator for generating vibration by causing a vibrating body, which is elastically installed in a housing, to be in a translational motion, and more particularly to a surface-mountable linear vibrator, in which a substrate member is fixed to a lower part of a housing.

2. Description of the Related Art

Various kinds of vibration generators for generating vibration, serving as an incoming call destination signal, are installed in mobile communication terminals, i.e., mobile phones. Vibrating motors are generally used as the above vibration generators. Each of the vibrating motors converts electrical energy to mechanical energy, and rotates an eccentric weight using the mechanical energy, thereby generating vibration.

Figure 1:
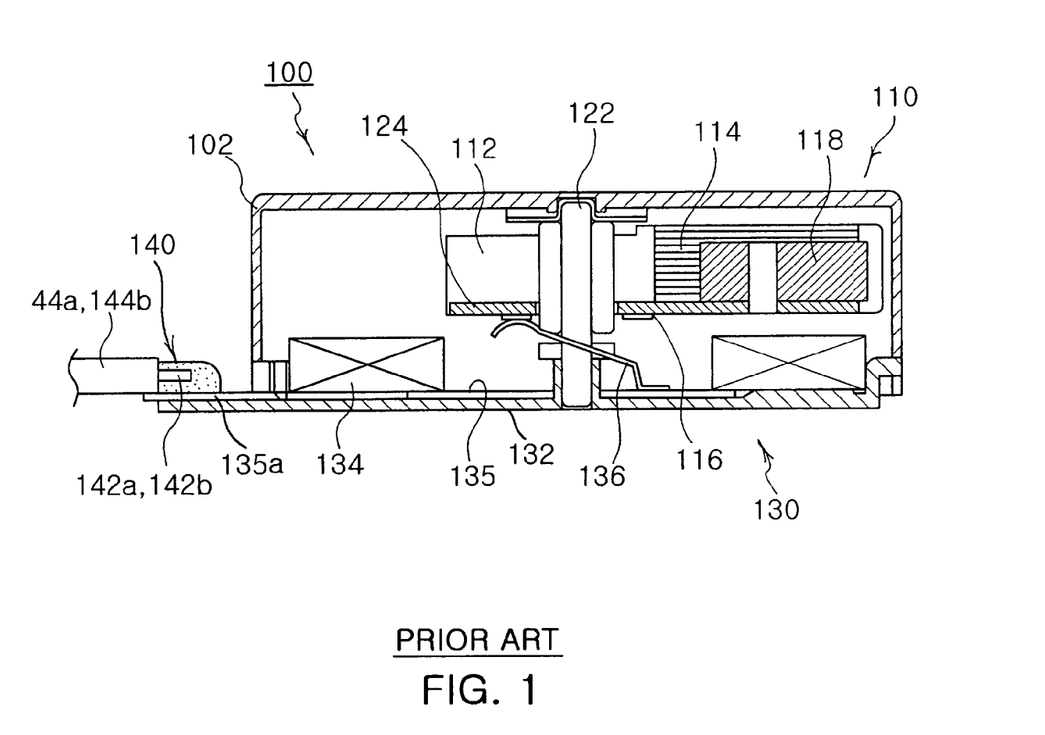
FIG. 1 is a cross-sectional view of a conventional linear vibrator.

FIG. 1 is a cross-sectional view of a conventional coin-type vibrating motor 100, which is used as a vibration generator.

As shown in FIG. 1, the conventional coin-type vibrating motor 100 comprises a rotor assembly 110, a stator assembly 130, and a housing 102 for accommodating the rotor assembly 110 and the stator assembly 130.

Here, the rotor assembly 110 includes a winding coil 114, a commutator 116, and a weight body 118. The winding coil 114 and the weight body 118 are installed on an insulating body 112, and the insulating body 112 is rotatably installed on a shaft 122, which is vertically placed in the housing 102.

An upper substrate 124 is attached to the lower surface of the insulating body 112, and the commutator 116, including a plurality of segments divided and spaced from each other by a constant interval in a circumferential direction, is attached to the lower surface of the upper substrate 124. Here, the commutator 116 is electrically connected to the winding coil 114.

The stator assembly 130 includes a bracket 132, a magnet 134, and a brush 136.

That is, as shown in FIG. 1, a lower substrate 135 is fixed to the upper surface of the bracket 132, and the lower part of the bracket 132 is bonded to the lower part of the housing 102 having an opened lower surface. The magnet 134 having a disk shape and the brush 136 are fixed to the upper surface of the lower substrate 135, and the brush 136 is electrically connected to an external power source through the lower substrate 135.

When the bracket 132 is attached to the lower part of the housing 102, the upper end of the brush 136 contacts the commutator 116, thereby supplying current to the winding coil 114 through the commutator 116.

A power supply unit 140 including anode and cathode terminals 142a and 142b and lead wires 144a and 144b is installed on the lower substrate 135, and is electrically connected to the external power source. That is, the lower substrate 135 includes a terminal 135a protruded to the outside of the housing 102, and the anode and cathode terminals 142a and 142b are installed on the upper surface of the terminal 135a. The lead wires 144a and 144b electrically connected to the external power source are electrically connected to the anode and cathode terminals 142a and 142b.

Accordingly, a current from the external power source is supplied to the brush 136 of the vibrating motor 100 through the lead wires 144a and 144b and the anode and cathode terminals 142a and 142b, thereby rotating the rotor assembly 110 using the interaction between the winding coil 114 and the magnet 134, and thus generating vibration.

Here, since the commutator 116 of the rotor assembly 110 includes a plurality of the segments, when the rotor assembly 110 is rotated, the commutator 116 contacts the upper end of the brush 136. Thereby, mechanical friction and electrical sparks between the brush 136 and the commutator 116 are generated, thus damaging the brush 136 and the commutator 116.

As a result, the vibrating motor 100 has deteriorated endurance, and a shortened lifespan.

Since the rotor assembly 110 of the vibrating motor 100 is rotated centering on the shaft 122, the housing 102 requires a space necessary for the rotation of the rotor assembly 110. Thus, the vibrating motor 100 cannot satisfy the miniaturization trend, and has a limit in serving as a vibrating generator for mobile phones, which are gradually miniaturized.

In case that the vibrating motor 100 is installed in a mobile phone, the vibrating motor 100 is disadvantageous in that the mobile phone requires a separate space for receiving the power supply unit 140 installed on the terminal 135a protruded to the outside of the housing 102 and the lead wires 144a and 144b are connected to the external power source.

The lead wires 144a and 144b are electrically connected to the external power source by soldering. At this time, failures in soldering cause disconnection or short circuits of the lead wires 144a and 144b, thereby increasing a failure rate of the mobile phone.

Since the available space in the mobile phone is small, it is not easy to handle the lead wires 144a and 144b.

SUMMARY OF THE INVENTION

Therefore, the present invention has been made in view of the above problems, and it is an object of the present invention to provide a surface-mountable linear vibrator, in which a substrate member is attached to a lower part of a housing so as to be installed by an automated process, and which does not use a lead wire so as to improve the reliability of connection.

In accordance with the present invention, the above and other objects can be accomplished by the provision of a surface-mountable linear vibrator comprising: a hollow cylindrical housing of a predetermined thickness having a space therein, the housing being provided with a closed upper surface and an opened lower surface; an elastic member fixed to an inner surface of an upper part of the housing; a vibrating body including a yoke installed within in the housing, the yoke being fixed to the elastic member to be affected by elastic force in an axial direction of the housing, a weight fixed to a periphery of the yoke, and a magnet fixed to a lower central part of the yoke; and a circular substrate member attached to a lower part of the housing, and provided with a winding coil fixed to the upper surface thereof, and connection means formed on the lower surface thereof and electrically connected to the winding coil, wherein power is applied to the winding coil through the connection means.

Preferably, the connection means may be a metal piece attached to the lower surface of the substrate member, or a conductive pattern formed on the lower surface of the substrate member.

Preferably, the substrate member may be a printed circuit board (PCB).

Preferably, connection grooves for assembling the housing with the substrate member may be formed in a lower part of the housing, and the depth of the connection grooves may be the same as or smaller than the thickness of the substrate member.

Further, preferably, the connection grooves may be separated from each other by the same interval so that the connection grooves are formed in the housing at the same angle.

Preferably, connection protrusions may be formed on the substrate member in a radial direction so that the connection protrusions are inserted into the connection grooves, and separated from each other by the same interval so that the connection protrusions are formed on the substrate member at the same angle.

Preferably, contact portions contacting an inner surface of a lower part of the housing may be formed on the substrate member so that the substrate member is concentric with the housing.

Preferably, the housing may be made of a conductive material and the contact portions may be plated with a conductive material.

Preferably, the substrate member may be provided with solder inflow portions, for forming a gap with an inner surface of the housing, formed on the circumferential surface thereof, and fixed to the housing by injecting solder into the gap.

Preferably, the housing may be made of a solderable material. Further, the solder inflow portions may be plated with a solderable material, and the solderable material may be a metal.

Moreover, preferably, the substrate member may further provided with ground means formed on the lower surface thereof, and the ground means may be a metal piece attached to the lower surface of the substrate member, or a conductive pattern formed on the lower surface of the substrate member.

BRIEF DESCRIPTION OF THE DRAWINGS

The above and other objects, features and other advantages of the present invention will be more clearly understood from the following detailed description taken in conjunction with the accompanying drawings, in which:

FIGS. 2a and 2b illustrate a surface-mountable linear vibrator in accordance with a preferred embodiment of the present invention, and more specifically:

DESCRIPTION OF THE PREFERRED EMBODIMENTS

Now, preferred embodiments of the present invention will be described in detail with reference to the annexed drawings.

Figure 2A:
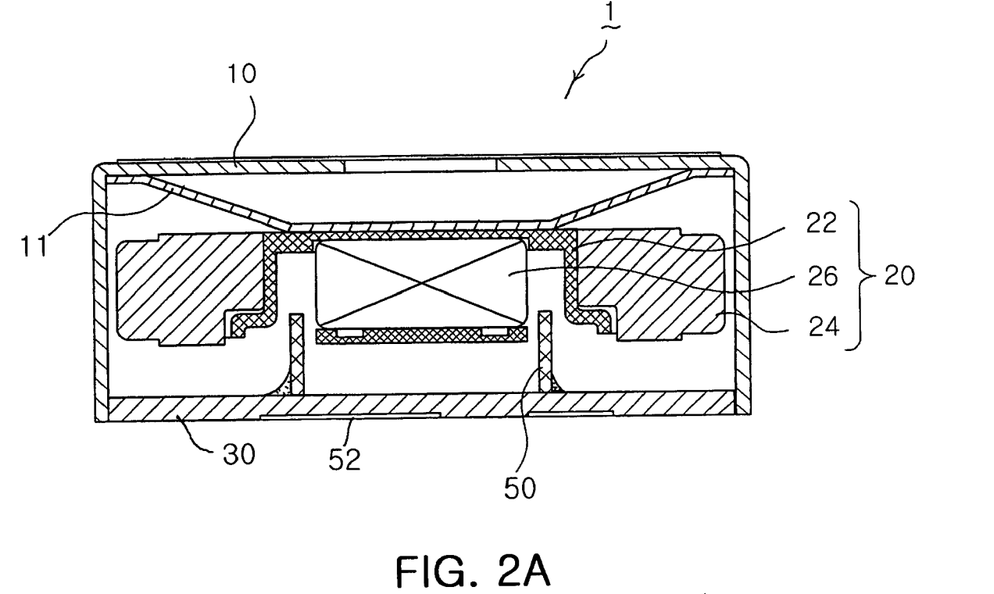
FIG. 2a is a longitudinal-sectional view of the surface-mountable linear vibrator.
Figure 2B:
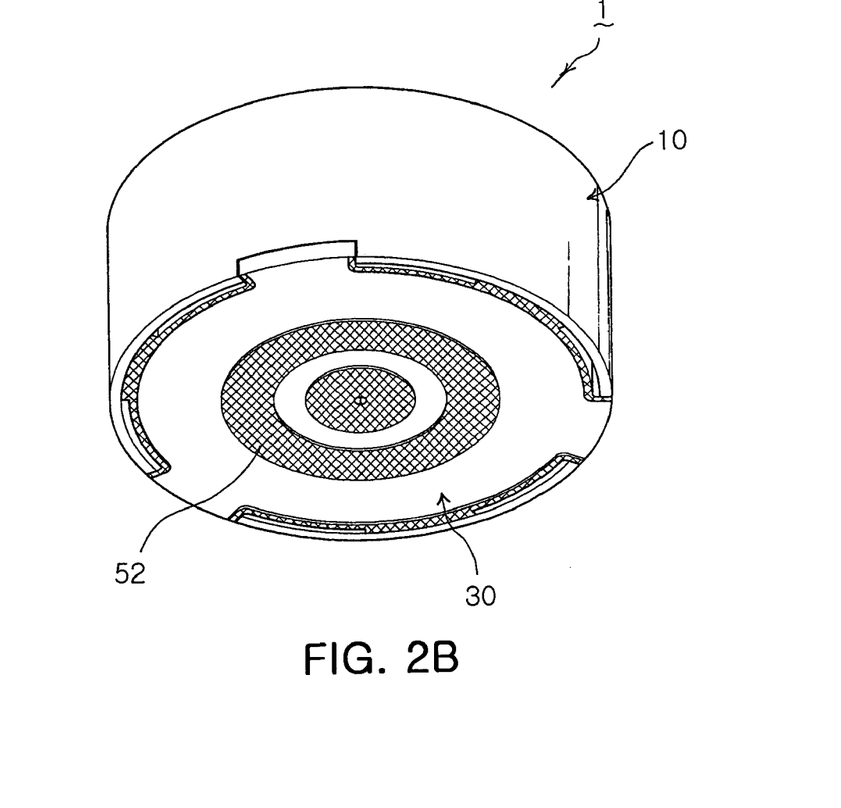
FIG. 2b is a perspective view of the surface-mountable linear vibrator.
Figure 3:
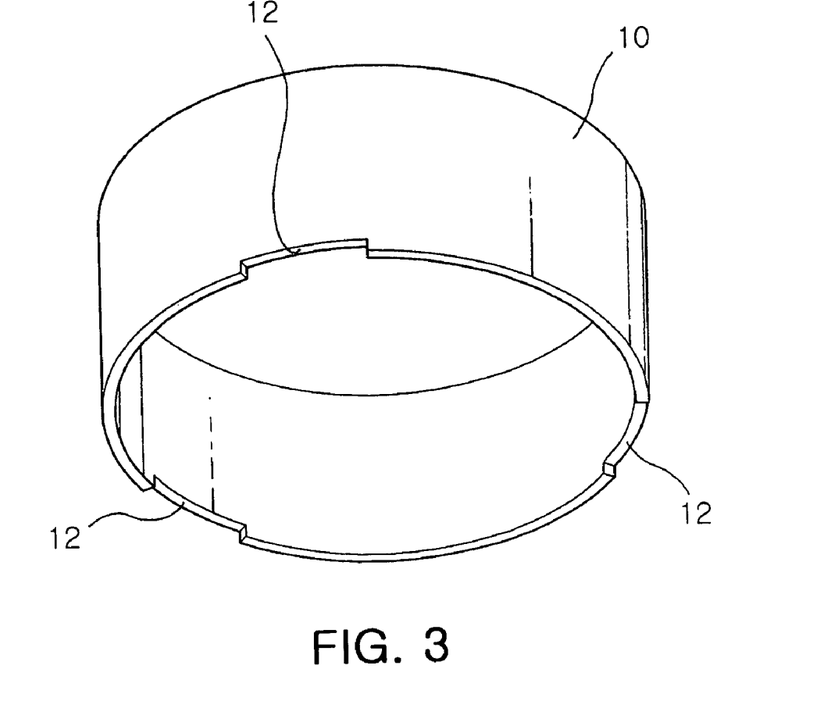
FIG. 3 is a perspective view of a housing of the surface-mountable linear vibrator in accordance with the preferred embodiment of the present invention.
Figure 4:
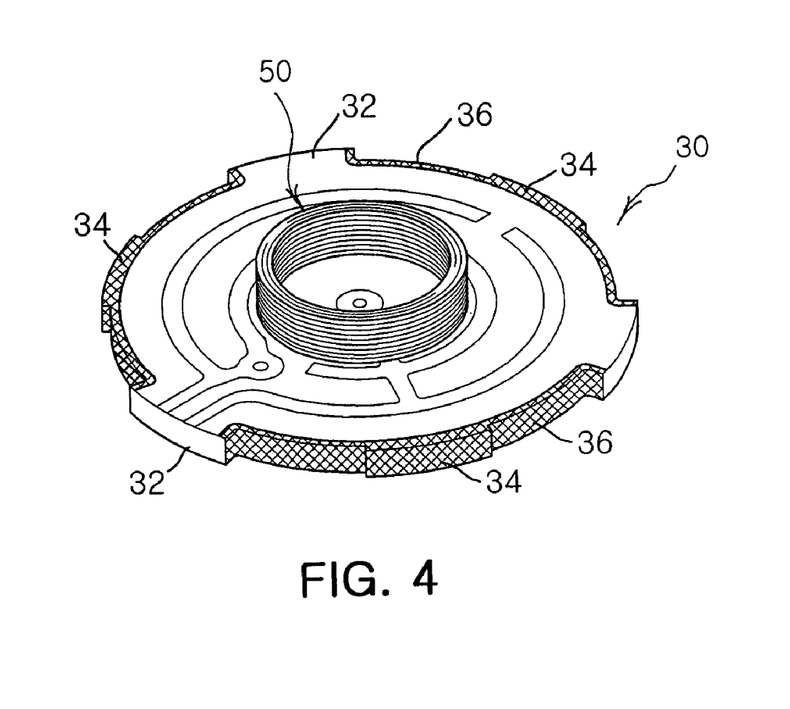
FIG. 4 is a perspective view of a substrate member of the surface-mountable linear vibrator in accordance with the preferred embodiment of the present invention.
Figure 5:
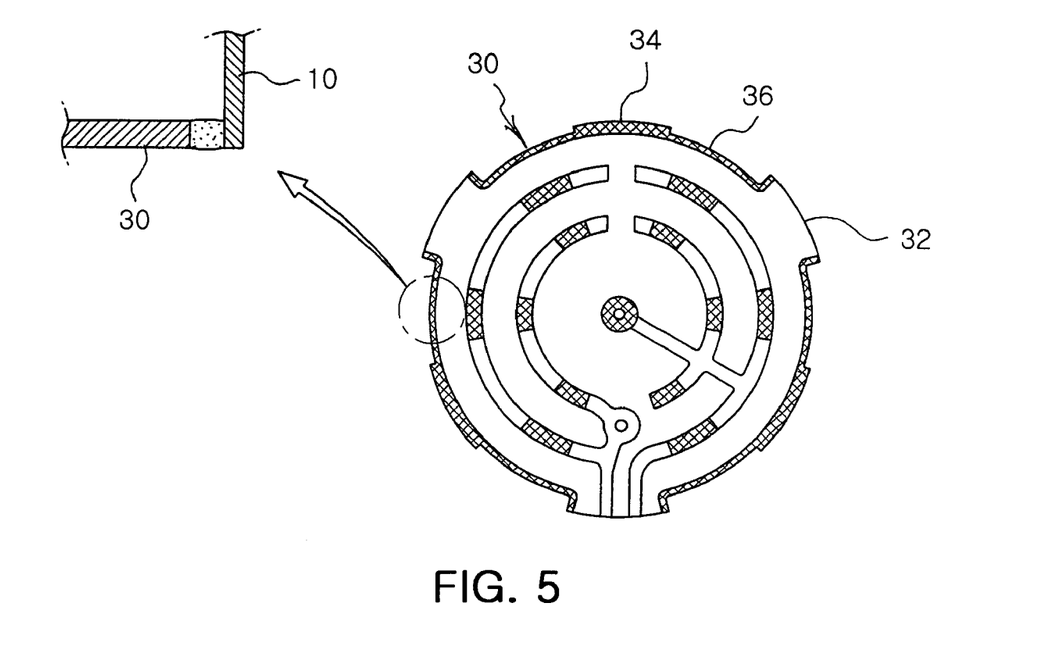
FIG. 5 is a plan view of the substrate member of FIG. 4.
Figure 6:
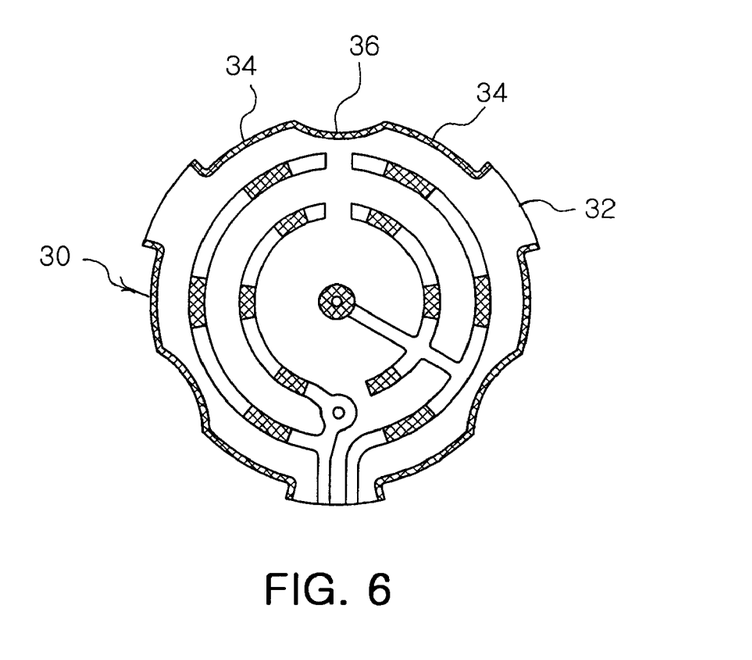
FIG. 6 is a plan view of a substrate member of a surface-mountable linear vibrator in accordance with a modified embodiment of the present invention.
Figure 7:
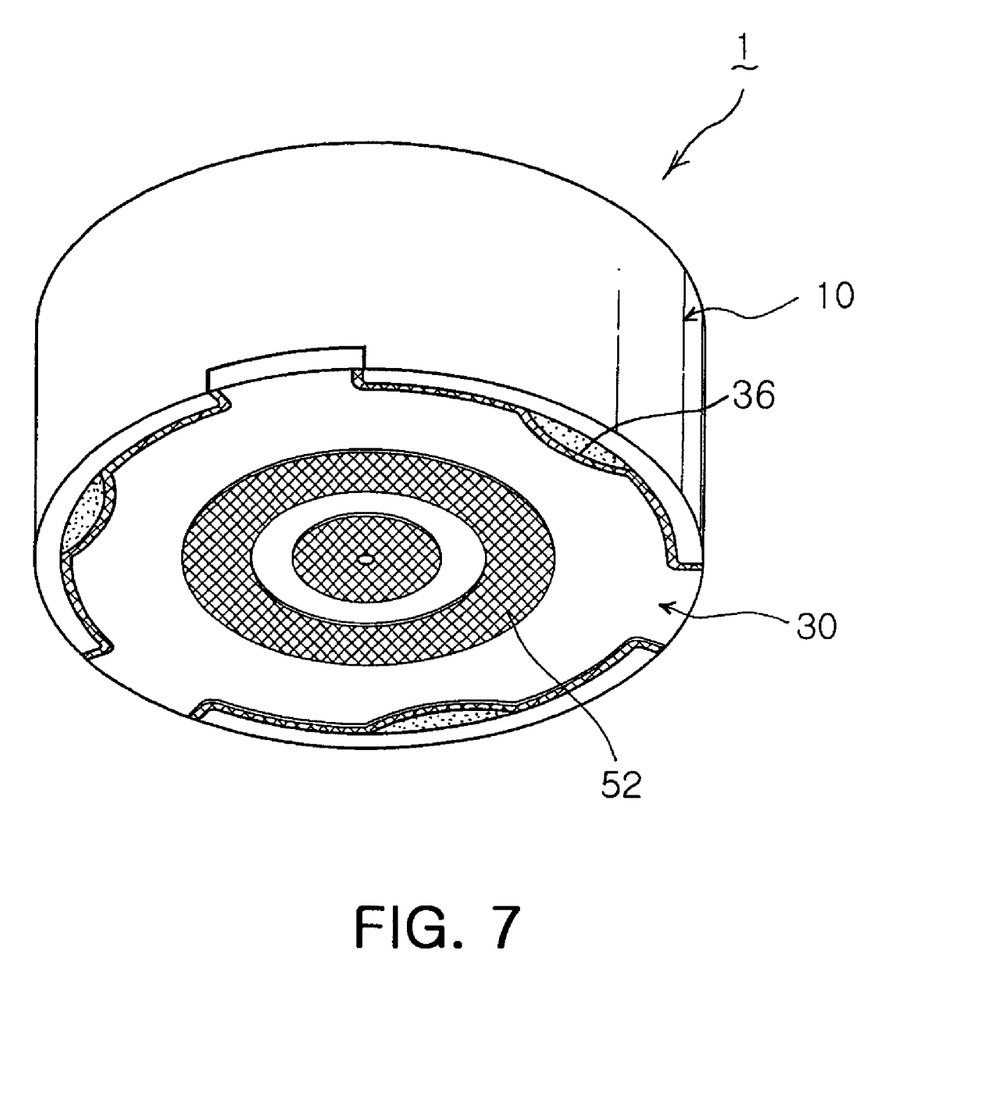
FIG. 7 is a perspective view of the surface-mountable linear vibrator in accordance with the modified embodiment of the present invention.

FIGS. 2a and 2b illustrate a surface-mountable linear vibrator in accordance with a preferred embodiment of the present invention, and more specifically FIG. 2a is a longitudinal-sectional view of the surface-mountable linear vibrator, and FIG. 2b is a perspective view of the surface-mountable linear vibrator. FIG. 3 is a perspective view of a housing of the surface-mountable linear vibrator in accordance with the preferred embodiment of the present invention. FIG. 4 is a perspective view of a substrate member of the surface-mountable linear vibrator in accordance with the preferred embodiment of the present invention. FIG. 5 is a plan view of the substrate member of FIG. 4. FIG. 6 is a plan view of a substrate member of a surface-mountable linear vibrator in accordance with a modified embodiment of the present invention. FIG. 7 is a perspective view of the surface-mountable linear vibrator in accordance with the modified embodiment of the present invention.

As shown in FIG. 2a, a surface-mountable linear vibrator 1 in accordance with the present invention comprises a housing 10, an elastic member 11, a vibrating body 20, and a substrate member 30.

The housing 10 has a cylindrical structure, having a constant thickness, provided with a closed upper surface and an opened lower surface so that a space is formed in the housing 10. The elastic member 11 is fixed to the inner surface of the upper portion of the inside of the housing 10. Preferably, the elastic member 11 is a circular plate spring, and the vibrating body 20 is fixed onto the central part of the elastic member 11.

Here, the vibrating body 20 includes a yoke 22, a weight 24, and a magnet 26, and the structure thereof will be described as follows.

The yoke 22 is made of metal, and is fixed to the elastic member 11 fixed to the inner surface of the upper portion of the inside of the housing 10. Accordingly, the yoke 22 is in a translational motion elastically in the housing 10 by the elastic force applied to the yoke 22 in an axial direction of the housing 10.

The weight 24 is fixed to the periphery of the yoke 22. The weight 24 serves to increase the vibration when the vibrating body 20 is in the translational motion. Here, the magnet 26 is fixed to the central part of the yoke 22 fixed to the periphery of the yoke 22.

As shown in FIGS. 2a and 2b, the substrate member 30 having a circular plate shape is attached to the lower part of the housing 10, and a winding coil 50 is fixed to the upper surface of the substrate member 30. Connection means 52 is formed on the lower surface of the substrate member 30, and the winding coil 50 is electrically connected to the connection means 52, thereby supplying power to the vibrating motor 1.

When the substrate member 30 is attached to the lower part of the housing 10, power is supplied to the winding coil 50, which is placed adjacent to the lower part of the magnet 26 of the vibrating body 20. Then, the vibrating motor 20 is excited by the interaction between the winding coil 50 and the magnet 26.

Here, when current having the same frequency as the specific vibration frequencies of the elastic member 11 and the vibrating body 20 is supplied to the winding coil 50, the elastic member 11 and the vibrating body 20 excite and resonate, thereby causing the linear vibrator 1 to generate vibration.

By using the above-described resonance, small exciting force generated between the winding coil 50 and the magnet 26 generates large vibration.

The connection means 52, which is attached to the lower surface of the substrate member 30, may be a piece made of conductive metal. Here, the winding coil 50 is electrically connected to the connection means 52, i.e., the metal piece, by a hole formed through the substrate member 30 or other structures.

Another metal piece (not shown) may be attached to the upper surface of the substrate member 30, and may be electrically connected to the winding coil 50. Here, the metal pieces, respectively attached to the upper and lower surfaces of the substrate member 30, are electrically connected to each other, thereby electrically connecting the metal piece attached to the lower surface of the substrate member 30 to the winding coil 50.

Further, the connection means 52 may be a conductive pattern printed on the lower surface of the substrate member 30. Here, in the same manner as the earlier-described metal piece, the conductive pattern printed on the lower surface of the substrate member 30 is electrically connected to the winding coil 50 fixed to the upper surface of the substrate member 30.

In the same manner as the earlier-described metal pieces, another conductive pattern may be printed on the upper surface of the substrate member 30, and be electrically connected to the conductive pattern printed on the lower surface of the substrate member 30.

Accordingly, in case that the surface-mountable linear vibrator 1 of the present invention is installed in a mobile phone, power is applied to the winding coil 50 through the connection means 52 formed on the lower surface of the substrate member 30. That is, the linear vibrator 1 of the present invention is mounted on the surface of a main board (not shown) electrically connected to the power source of the mobile phone, thereby allowing power to be applied to the winding coil 50 through the connection means 52 formed on the lower surface of the substrate member 30.

More preferably, the substrate member 30 is a PCB (printed circuit board). The PCB is a board, onto which electrical components are soldered, and has a structure in which a plurality of sheets provided with conductive patterns formed thereon are stacked.

Since the electrical components fixed onto the PCB are electrically connected through the conductive patterns, a circuit using the PCB does not require electric wires for electrically connecting the components.

Accordingly, in case that the PCB is used as the substrate member 30, power is supplied to the winding coil 50 through the conductive pattern formed on the lower surface of the PCB.

As shown in FIG. 3, the housing 10 has a cylindrical structure, having a constant thickness, provided with a closed upper surface and an opened lower surface so that a space is formed in the housing 10. A plurality of connection grooves 12 for the connection with the substrate member 30 are formed through the lower end of the housing 10. Preferably, the connection grooves 12 indent the lower end of the housing 10.

As shown in FIG. 4, the substrate member 30 includes a plurality of connection protrusions 32 formed in a radial direction so that the connection protrusions are inserted into the connection grooves 12. The connection protrusions 32 formed on the substrate member 30 are prepared at the same positions and in the same number as the connection grooves 12 formed in the housing 10.

Accordingly, the housing 10 and the substrate member 30 are assembled by inserting the connection protrusions 32 into the connection grooves 12. Here, the height of the connection grooves 12 is the same as the thickness of the substrate member 30, or is smaller than the thickness of the substrate member 30. Thereby, when the housing 10 and the substrate member 30 are assembled, the lower end of the housing 10 is not protruded from the lower surface of the substrate member 30.

Further, as shown in FIGS. 3 and 4, preferably, the separation interval of the connection grooves 12 formed in the housing 10 and the separation interval the connection protrusions 32 formed on the substrate member 30 are the same so that the connection grooves 12 and the connection protrusions 32 are respectively formed in the housing 10 and on the substrate member at the same angle.

Thereby, the housing 10 is stably supported by the substrate member 30 using the connection grooves 12 and the connection protrusions 32.

As shown in FIGS. 4 and 5, the substrate member 30 includes contact portions 34 formed on the circumferential surface thereof. When the housing 10 and the substrate member 30 are assembled, the contact portions 34 contact the inner surface of the lower end of the housing 10, thereby allowing the housing 10 and the substrate member 30 to be concentrically placed.

Here, the housing 10 is made of a conductive material, and the side, upper, and lower surfaces of the contact portions 34 are plated with a conductive material. This configuration electrically connects the housing 10 and the substrate member 30 through the contact portions 34, when the housing 10 and the substrate member 30 are assembled, thereby grounding the housing 10 and the substrate member 30.

Accordingly, in case that the linear vibrator of the present invention is installed in a portable phone, the linear vibrator has a ground function by means of the plate layer formed on the substrate member 30 or the housing 10 electrically connected to the substrate member 30.

Solder inflow portions 36, for forming a gap for allowing solder to flow between the circumferential surface of the substrate member 30 and the inner surface of the housing 10 when the housing 10 and the substrate member 30 are assembled, are formed on the circumferential surface of the substrate member 30.

Accordingly, the housing 10 and the substrate member 30 are firmly assembled by introducing the solder into the gap therebetween and then solidifying the solder.

Here, as shown in FIG. 5, the solder inflow portions 36 are placed adjacent to the contact portions 34 between the connection protrusions 32. That is, as shown in FIG. 4, a plurality of the connection protrusions 32 separated from each other by the same interval are formed on the circumferential surface of the substrate member 30 so that the connection protrusions 32 are formed at the same angle, and the contact portions 34 plated with a conductive material and the solder inflow portions 36 plated with a solderable material are formed between the connection protrusions 32.

The contact portions 34 contact the inner surface of the lower part of the housing 10, thereby guiding the position of the housing 10 so that the housing 10 is concentric with the substrate member 30. For this reason, the contact portions 34 form a circumference having a smaller diameter than that of a circumference formed by the connection protrusions 32.

That is, preferably, the connection protrusions 32 form a circumference having the same diameter as the outer diameter of the housing 10, and the contact portions 34 form a circumference having the same diameter as the inner diameter of the housing 10.

Since the solder inflow portions 36 form the gap with the inner surface of the lower part of the housing 10, the solder inflow portions 36 form a circumference having a diameter smaller than the inner diameter of the housing 10.

The housing 10 is made of a solderable material. In case that molten solder flows into the gap between the solder inflow portions 36 of the substrate member 30 and the inner surface of the lower part of the housing 10, the housing 10 is easily fixed to the substrate member 30 by the solder.

The solderable material is preferably metal, and more preferably conductive metal.

The substrate member 30 further includes ground means, which is a metal piece or a conductive pattern like the connection means, formed on the lower surface thereof. Thereby, when the linear vibrator of the present invention is installed in a portable phone, the linear vibrator is grounded by the ground means formed on the substrate means 30.

FIG. 6 is a plan view of a modification of the substrate member 30 of FIG. 5. That is, the solder inflow portions 36 and the contact portions 34 are modified as shown in FIG. 6, and FIG. 7 illustrates the application of the modified solder inflow portions 36 and contact portions 34 to the linear vibrator 1.

Here, the solder inflow portions 36 are plated with a solderable material, and the housing 10 is made of a solderable material. That is, since the side surfaces of the solder inflow portions 36 are plated with a solderable material, the housing 10 and the substrate member 30 are firmly bonded by injecting molten solder into a gap between the inner surface of the housing 10 and the solder inflow portions 36 of the substrate member 30.

In the same manner as the above-described preferred embodiment of the present invention, the solderable material is preferably conductive metal. Further, ground means is formed on the lower surface of the substrate member 30, and preferably, the ground means is a metal piece attached to the lower surface of the substrate member 30 or a conductive pattern printed on the lower surface of the substrate member 30.

The above-described surface-mountable linear vibrator 1 of the present invention has functions and effects, as follows.

As mobile communication phones gradually have complex functions and miniaturized size, configurations of mobile communication terminals are integrated and it is not easy to install electronic components in the mobile communication terminals.

This increases the number of the electronic components installed in the mobile communication terminals and miniaturizes the sizes of the electronic components, thereby limiting methods for manually installing the electronic components in the mobile communication terminals.

Accordingly, in order to solve the above-described problems, surface mount technology (SMT) is applied to a linear vibrator serving as a vibration generator, which is installed in a mobile phone.

The above SMT is one of methods for connecting electronic components to a substrate. In the SMT, the electronic components are directly connected to a connection pattern formed on the surface of the substrate by soldering, while, in insert mount technology, leads (pins for connection) of the electronic components are inserted into holes formed through the substrate.

The SMT facilitates the automatic installation of the electronic components in the mobile communication terminals so as to improve the productivity of the mobile communication terminals, and improves accuracy in positioning the electronic components on the substrate and reliability of connecting the electronic components and the substrate.

The surface-mountable linear vibrator 1 of the present invention, which comprises the connection means 52 formed on the substrate member 30 bonded to the lower part of the housing 10, is mounted on the surface of a main board (not shown) for a mobile phone, thereby being capable of being automatically installed in the mobile phone.

When the surface-mountable linear vibrator of the present invention is installed in the mobile phone, power is applied to a coil fixed to the upper part of the substrate member 30 through the connection means 52 formed on the lower part of the substrate member 30. Thus, the surface-mountable linear vibrator does not require any additional lead wire, thereby having a simple structure.

The surface-mountable linear vibrator of the present invention is mounted on the surface of the main board for the mobile phone and is simultaneously electrically connected to the main board, thereby not requiring an additional step of connecting lead wires. Further, the surface-mountable linear vibrator of the present invention has effects of improving reliability of connection.

The surface-mountable linear vibrator of the present invention is grounded using ground means formed on the substrate member without an additional structure, thereby having a simple structure.

As apparent from the above description, the present invention provides a surface-mountable linear vibrator, which comprises a substrate member used as a base fixed to the lower part of a housing, so that the surface-mountable linear vibrator is installed in a mobile phone by an automated process using the SMT, thereby improving work efficiency.

Further, since the electrical connection of the surface-mountable linear vibrator is achieved by the substrate member, the surface-mountable linear vibrator of the present invention does not use an electric wire, thereby improving reliability of connection and being easily installed in a mobile phone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A surface-mountable liner vibrator comprising:
a hollow cylindrical housing of a predetermined thickness having a space therein, the housing being provided with a closed upper surface and an opened lower surface;
an elastic member fixed to an inner surface of an upper part of the housing;

a vibrating body including a yoke installed within in the housing, the yoke being fixed to the elastic member to be affected by elastic force in an axial direction of the housing, a weight fixed to a periphery of the yoke, and a magnet fixed to a lower central part of the yoke; and a circular substrate member attached to a lower part of the housing, and provided with a winding coil fixed to the upper surface thereof, and connection means formed on the lower surface thereof and electrically connected to the winding coil, wherein power is applied to the winding coil through the connection means.

2. The surface-mountable linear vibrator as set forth in claim 1, wherein the connection means is a metal piece attached to the lower surface of the substrate member.

3. The surface-mountable linear vibrator as set forth in claim 1, wherein the connection means is a conductive pattern formed on the lower surface of the substrate member.

4. The surface-mountable linear vibrator as set forth in claim 1, wherein the substrate member is a printed circuit board (PCB).

5. The surface-mountable linear vibrator as set forth in claim 1, wherein connection grooves for assembling the housing with the substrate member are formed in a lower part of the housing.

6. The surface-mountable linear vibrator as set forth in claim 5, wherein the depth of the connection grooves is the same as or smaller than the thickness of the substrate member.

7. The surface-mountable linear vibrator as set forth in claim 5, wherein the connection grooves are separated from each other by the same interval so that the connection grooves are formed in the housing at the same angle.

8. The surface-mountable linear vibrator as set forth in claim 5, wherein connection protrusions are formed on the substrate member in a radial direction so that the connection protrusions are inserted into the connection grooves.

9. The surface-mountable linear vibrator as set forth in claim 8, wherein the connection protrusions are separated from each other by the same interval so that the connection protrusions are formed on the substrate member at the same angle.

10. The surface-mountable linear vibrator as set forth in claim 1, wherein contact portions contacting an inner surface of a lower part of the housing are formed on the substrate member so that the substrate member is concentric with the housing.

11. The surface-mountable liner vibrator as set forth in claim 1, wherein the housing is made of a conductive material and the contact portions are plated with a conductive material.

12. The surface-mountable linear vibrator as set forth in claim 1, wherein the substrate member is provided with solder inflow portions, for forming a gap with an inner surface of the housing, formed on the circumferential surface thereof, and fixed to the housing by injecting solder into the gap.

13. The surface-mountable linear vibrator as set forth in claim 12, wherein the housing is made of a solderable material.

14. The surface-mountable linear vibrator as set forth in claim 13, wherein the solder inflow portions are plated with a solderable material.

15. The surface-mountable linear vibrator as set forth in claim 13, wherein the solderable material is a metal.

16. The surface-mountable linear vibrator as set forth in claim 1, wherein the substrate member is further provided with ground means formed on the lower surface thereof.

17. The surface-mountable linear vibrator as set forth in claim 16, wherein the ground means is a metal piece attached to the lower surface of the substrate member.

18. The surface-mountable linear vibrator as set forth in claim 17, wherein the ground means is a conductive pattern formed on the lower surface of the substrate member.

19. The surface-mountable linear vibrator as set forth in claim 14, wherein the solderable material is a metal.

20. A surface-mountable linear vibrator, comprising:

a hollow housing of a predetermined thickness having a space therein;

an elastic member fixed to an inner surface of an upper part of the housing;

a vibrating body including
a yoke installed within in the housing, the yoke being fixed to the elastic member to be elastically moveable in an axial direction of the housing,
a weight fixed to a periphery of the yoke, and
a magnet fixed to a lower central part of the yoke;

a substrate member attached to a lower part of the housing, and having opposite upper and lower surfaces;

a winding coil fixed to the upper surface of said substrate member; and a connection element formed on the lower surface of said substrate member and electrically connected to the winding coil, whereby power is applicable to the winding coil through the connection element.

* * * * *